United States Patent [19]

Murray et al.

[11] Patent Number: 4,576,402

[45] Date of Patent: Mar. 18, 1986

[54] LOCKING PIPE SUB

[75] Inventors: W. Kirby Murray; David O. Sullivan, both of Bossier City, La.

[73] Assignee: Tri-State Oil Tool Industries, Inc., Bossier City, La.

[21] Appl. No.: 477,164

[22] Filed: Mar. 21, 1983

[51] Int. Cl.⁴ .............................................. F16L 35/00
[52] U.S. Cl. ........................................ 285/39; 285/92; 285/178; 285/333; 285/24; 403/20; 403/343; 403/353; 411/264; 411/384; 166/301
[58] Field of Search ............... 285/81, 92, 390, 355, 285/333, 334, 39, 178, 24; 403/343, 350, 20; 166/301, 98, 99; 294/86.22; 411/259, 263, 264, 272, 333, 383, 384

[56] References Cited

U.S. PATENT DOCUMENTS

| 171,898 | 1/1876 | Wiles | 285/92 X |
| 1,769,381 | 7/1930 | Montgomery | 285/390 X |
| 2,845,106 | 7/1958 | Baker | 285/81 X |
| 3,086,796 | 4/1963 | Yancey | 285/81 |
| 3,101,925 | 8/1963 | Dziallas et al. | 285/81 X |
| 4,362,420 | 12/1982 | Veken | 403/343 |

Primary Examiner—Dave W. Arola
Attorney, Agent, or Firm—Vinson & Elkins

[57] ABSTRACT

A locking pipe sub is disclosed including a threaded pin connection for engaging, for example, a pipe stuck in a well bore. The threads on the pin are formed in two sections which are adapted to align upon initial make-up of the sub to the stuck pipe, but to misalign, both axially and radially, when reverse torque is applied to the sub. The result is to create axial and radial forces between the threads of the sub and the threads of the stuck pipe which positively lock the sub against disconnection from the pipe except with the use of a releasing tool.

9 Claims, 6 Drawing Figures

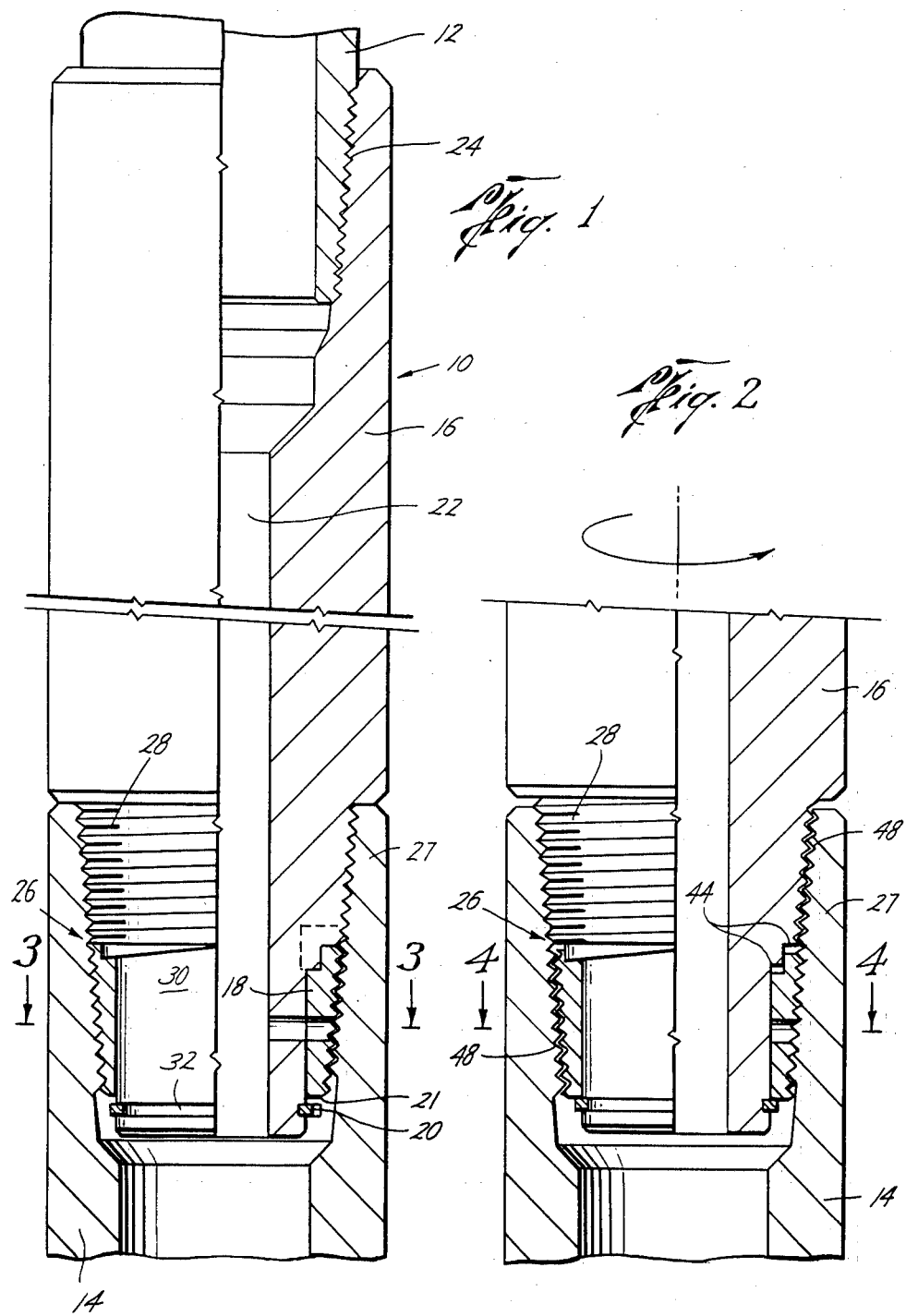

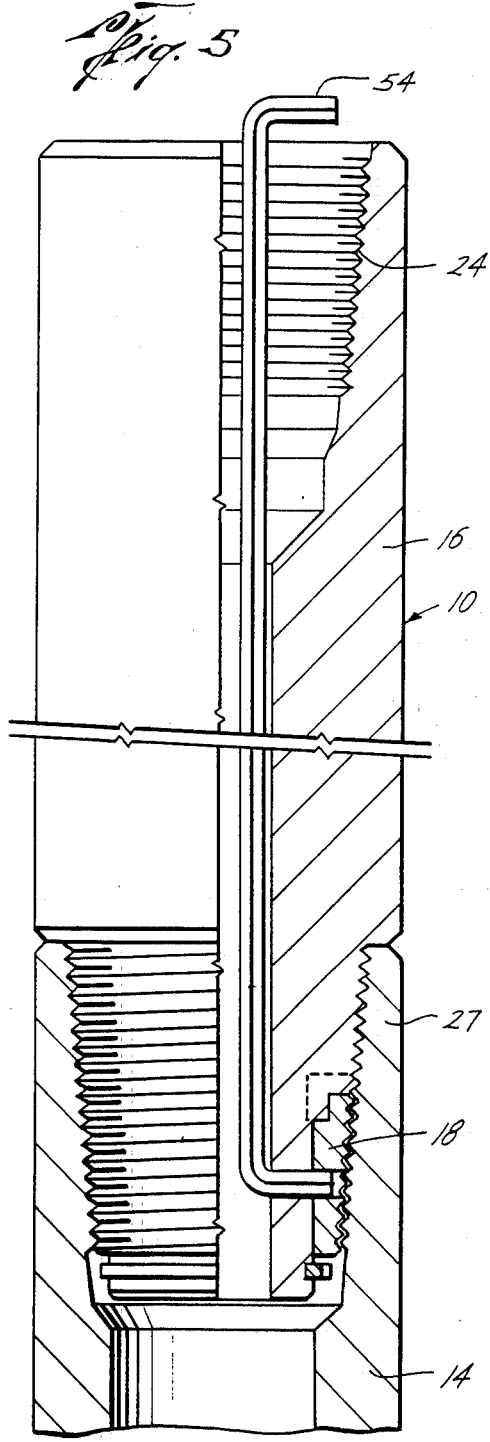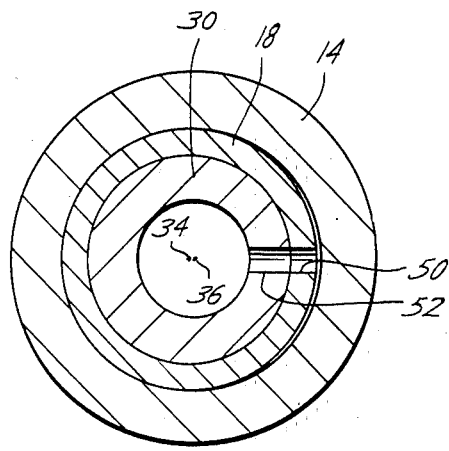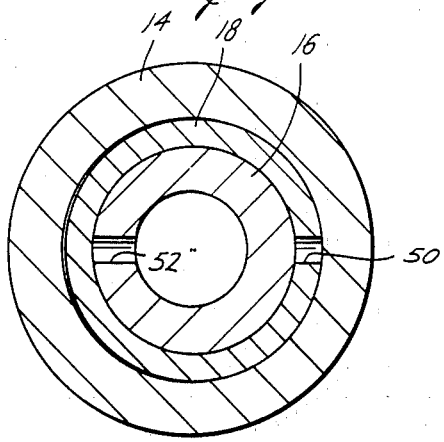

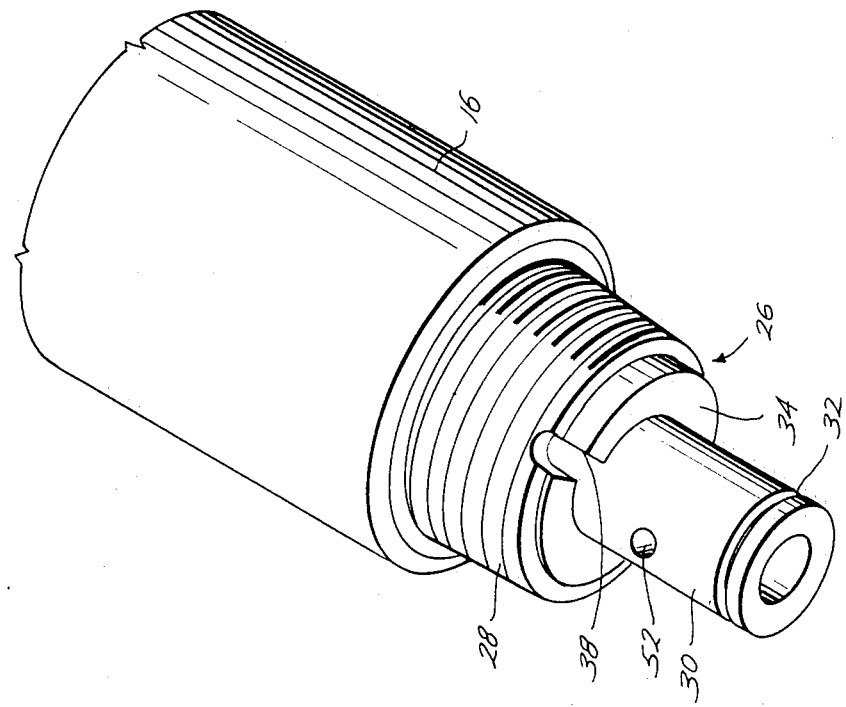
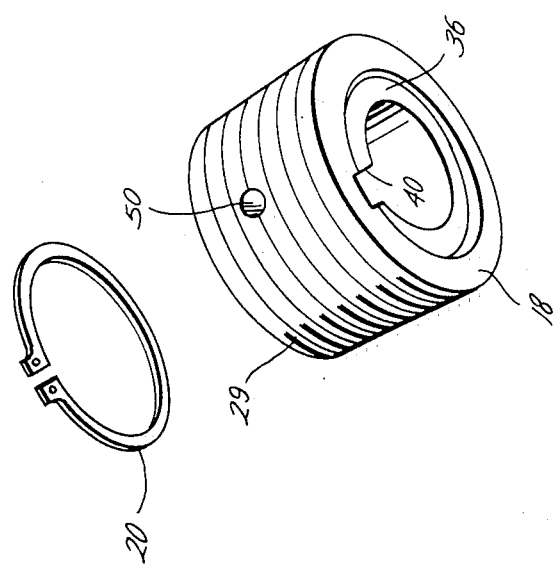
Fig. 6

LOCKING PIPE SUB

This invention relates to the field of well drilling methods and apparatus, and more particularly to a locking pipe sub useful in "fishing" operations to retrieve tubing stuck in a well bore. More broadly, the invention also is applicable to many other circumstances where it is desirable to make up a threaded connection, or coupling, which cannot be disconnected without the use of a special releasing tool.

In conducting well drilling operations, it is not uncommon for a string of drill pipe to become stuck in the hole due to, for example, a cave-in of a portion of the well bore wall. Such a stuck object in a well is known as a "fish."

When this occurs, known prior art methods are used to locate the point where the drill pipe is stuck. A coupling between two lengths of the pipe is then selected at a point above the obstruction for application of a "back-off shot." In performing the back-off shot, a small explosive charge is lowered by wireline to the selected coupling above the point where the pipe string is stuck in the well, and a selected left-hand, or loosening, torque is applied to the pipe string from the surface while the charge is detonated. The limited shock provided by the detonation will cause the selected coupling to loosen preferentially to any other coupling in the pipe string, and the pipe above the selected coupling is then disconnected and removed from the well bore.

A "bumper jar" may then be lowered on a pipe string and threadedly attached to the stuck pipe in an effort to jar additional pipe free from the obstruction. If all of the pipe is freed, it is simply brought to the surface. However, if only a portion of the stuck pipe, as, for example, a few stands of pipe, are freed from the obstruction, it may then be desired to repeat the back-off shot to remove the additional freed pipe from the well, so that the bumper jar can be re-connected at a point near the obstruction. However, a difficulty is encountered in that the application of the back-off shot requires a controlled left-hand torque so as to loosen the coupling where the shot is applied. In the application of the original back-off shot, this creates no problem, since all couplings in the pipe string are made up to a uniform tightness when the pipe string is lowered into the well hole. The controlled left-hand torque may then be applied at a level insufficient to loosen any of the couplings except the one where the back-off shot is applied. In the application of subsequent back-off shots this is rendered difficult, because the newly-made connection between the bumper jar and the stuck pipe in the well bore will likely not be as tight as the original couplings between the other joints in the pipe string. The application of left-hand torque may then cause the pipe string to disconnect between the fish and the bumper jar, rather than at the coupling where the back-off shot is applied.

It is therefore desirable to be able to threadedly couple the bumper jar to the pipe stuck in the well in a way so that the connection may be made by application of ordinary right-hand rotational and torque forces, but in which the threaded connection, once made, will lock and cannot be disconnected by the subsequent application of left-hand torque to the pipe string.

It is accordingly the primary object of this invention to provide an apparatus which may be easily threadedly connected to a tubing string or other object and which, once so threadedly engaged, cannot be disconnected by the application of reverse torque.

A further object is to provide such an apparatus in which the "locked" threaded connection may be disconnected easily with the use of a releasing tool.

These and other objects and advantages of the invention will become apparent from the drawings, the specification and the claims. In the accompanying drawings, which illustrate the preferred embodiment of the invention, and wherein like numerals indicate like parts:

FIG. 1 is a vertical view, partly in section, of the locking sub according to the present invention threadedly connected to a pipe stuck in the well bore and to which it is desired to make a locked connection.

FIG. 2 is a view similar to FIG. 1 of the threaded connection between the locking sub and the stuck pipe, and illustrating how the initial reverse rotation of the locking sub responsive to the application of left-hand torque to the sub will cause the threaded connection between the sub and the pipe to lock, thereby preventing further left-hand rotation of the sub relative to the pipe.

FIG. 3 is a cross-sectional view taken along line 3—3 of FIG. 1, and illustrating relative positions of parts of the locking sub and stuck pipe when the connection between the locking sub and pipe is made up.

FIG. 4 is a view in cross-section taken along line 4—4 of FIG. 2 and illustrating relative positions of parts of the locking sub and stuck pipe when the application of left-hand torque has caused the locking sub to rotate a half-turn in a counterclockwise direction.

FIG. 5 is a vertical view, partly in cross-section, illustrating the use of the releasing tool which permits the locked coupling between the pipe and sub to be threadedly disconnected once the stuck pipe has been brought to the surface.

FIG. 6 is a perspective view illustrating the parts of the locking sub in exploded relationship.

Referring now to FIG. 1, there is shown the locking sub 10 threadedly engaged at its upper end to a pipe 12, by means of which the locking sub has been lowered into a well bore. As indicated above, pipe 12 may be a bumper jar or other apparatus used in connection with well fishing operations. The lower end of the locking sub 10 is threadedly engaged with a pipe 14, which may be a "fish" stuck in the well bore, or any other object to which it is desired to make a locked threaded connection.

The locking sub 10 comprises a tubular body 16, an externally threaded tapered sleeve 18, and a locking snap ring 20. The tubular body 16 has a central bore 22 extending vertically therethrough and has an internally threaded box end portion 24 providing means for releasable engagement of the locking sub with pipe 12. The threaded coupling between the pipe 12 and sub 10 is made up at the surface before the sub is lowered into the well bore to engage the stuck pipe 14, and therefore may be made up with the same tightness as the other couplings in the drill string.

The lower portion of the locking sub 10 terminates in an externally threaded tapered pin 26 adapted to threadedly engage the threaded box end 27 of the stuck pipe 14. The threads of pin 26 are formed in two parts. The first threaded portion 28 is formed integrally with the tubular body 16. The second threaded portion 29 of the tapered threaded pin 26 is formed by external threads on the tapered sleeve 18. The sleeve 18 is rotatably mounted about a vertical shaft 30 formed integrally with the sub body 16 and is retained in place by the snap ring 20 received within a groove 32 in the lower end of the shaft 30. For reasons described more fully hereinafter, a small clearance 31 permits limited axial movement of the second threaded portion 29 relative to the first threaded portion 28 of the pin 26.

Means are provided in connection with the locking sub 10 to axially and radially align the two threaded portions 28 and 29 of the pin section 26 when the sub is rotated in a right-hand, clockwise, direction to threadedly engage the sub with the stuck pipe 14, but to axially and radially misalign the two threaded portions when the sub is rotated in the reverse direction, tending to release the sub from the pipe 14. The result is to radially and axially jam the threaded connection between the sub and the pipe 14 upon initial left-hand rotation of the sub 10 and thereby to lock the threaded connection together and prevent further left-hand rotation of the sub until the same is released as hereinafter described.

In the preferred embodiment, two such alignment/misalignment means are provided: one adapted to move the first threaded portion 28 in a direction axial to the lower threaded sleeve 18, and thereby the second threaded portion 29; the other adapted to move the upper threaded portion 28 in a direction radial to the lower threaded sleeve 18, and second threaded portion 29.

Means for axial displacement of the first threaded portion 28 of the pin 26 relative to the threaded sleeve 18 are provided by cooperating cam surfaces 34 on the locking sub body and 36 on the upper portion of the threaded sleeve 18 (FIG. 6). The opposed cam surfaces have a pitch greater than the pitch of the threads 28 and 29. For example, the cams may have a pitch of 3 and the threads, a pitch of 4.

Opposed shoulders 38 on the locking sub body and 40 on the sleeve 18 are adapted to engage to limit rotation of the sleeve 18 in one direction, but to permit rotation in the other direction. In operation, the opposed shoulders 38 and 40 are engaged as the pin section 26 of the locking sub 10 is made up into the threaded box end 27 of the stuck pipe 14. This prevents rotation of the sleeve 18 relative to the body portion 16 of the sub, while transmitting torque between the body 16 and sleeve 18, and therefore enables the sub and pipe to be readily coupled by the application of ordinary right-hand rotation of the sub 10 relative to the pipe 14. Further, the opposed cam surfaces 34 and 36 are so configured that the first and second threaded portions 28 and 29 of the pin 26 are in contiguous axial alignment when the opposed shoulders 38 and 40 are engaged as the locking sub is engaged with the pipe 14.

When reverse torque is applied to the locking sub by means of the pipe 12, the body 16 will tend to rotate counterclockwise with respect to the sleeve 18, since the reverse, or left-hand, torque will not be transmitted to the sleeve 18 by the shoulders 38 and 40. The opposed cam surfaces 34 and 36 will slide upon each other and tend to displace the body 16 axially upwardly with respect to the stationary sleeve 18, as represented by the somewhat exaggerated spaces 44 shown in FIG. 2 between the body and sleeve 18. Axial displacement of the body relative to the sleeve 18 is accommodated by a reduction of the spacing gap 21 between the sleeve 18 and locking ring 20 and a corresponding opening of the spaces 44. Since the pitch of the cam surfaces is greater than the pitch of the threads 28, the cams tend to displace the body 16 and threads 28 upwardly faster than the thread pitch can accommodate. The result is the transformation of the reverse torque forces into up and down axial force components on the threads 28 and 29. Since both the first threaded portion 28 on the body and second threaded portion 29 on the sleeve 18 are engaged with the same threaded box connection 27 in the stuck pipe 14, the effect is to apply an axial binding force between the two threaded portions of the locking sub and the threaded box connection 27 which prevents further left-hand rotation of the sub 10 relative to the pipe 14.

Although the binding effect produced by the axial forces responsive to axial displacement of the sleeve 18 relative to the body 16 by the action of the opposed cam surfaces 34 and 36 would, in all likelihood, be sufficient to prevent disconnection of the locking sub from the pipe 14, additional means preferably also are provided for displacing the sleeve 18 radially with respect to the body 16 of the locking sub to provide an additional radial force tending to bind to the sub and the pipe against disengagement.

Such means for radial displacement preferably are provided by slightly offsetting the vertical centerline 44 of the shaft portion 30 of the locking sub body with respect to the centerline 46 of the remainder of the locking sub body (FIG. 3). Since the threads 28 on the body 16 will rotate about the centerline of the body, while the shaft 30 must rotate elliptically about its offset centerline, the effect is to create opposed radial forces on the threads 28 on the body and 29 on the sleeve 18. Thus, upon initial counterclockwise rotation of the body 16 with respect to the sleeve 18 responsive to a left-hand torque being applied by the pipe 12, the effect of the elliptical centerline of the shaft 30 will displace the two threaded portions 28 and 29 radially with respect to each other as shown in somewhat exaggerated fashion by the spaces 48 in FIG. 2 appearing at opposite sides of the threaded connection between the threaded portions 28 and 29 with the threads of the pipe 14. The effect of such displacement is to create a radial binding force between the threads 28 and 29 of the locking sub 10 and the threads of the stuck pipe 14, which prevents further counterclockwise rotation of the body and therefore prevents disengagement of the sub 10 from the pipe 14.

In the manufacturing of the pipe sub 10, the shaft 30, cam surface 34 and shoulder 38 on the body portion 16, and the cam surface 36 and shoulder 40 on the sleeve 18 are preferably machined prior to the cutting of the threads 28 and 29. Sleeve 18 is then mounted on the shaft 30 with the shoulders 38 and 40 in engagement, and the sleeve 18 is spot welded to the lower portion of the shaft 30 to prevent rotation or displacement between the two while the threads 28 on the body and 29 on the sleeve are machined in a continuous operation. Aligned holes 50 in the sleeve 18 and 52 in the shaft 30 are also drilled at this time to provide means for locking the body and sleeve against relative rotation when it is desired to release the sub from the pipe 14, as explained more fully hereinafter.

After the threads have been machined and holes 50 and 52 drilled, the spot weld between the sleeve and the shaft 30 may then be broken, so that the two can be rotated and axially displaced relative to each other. The groove 32 for holding the latch ring 20 may be machined either before or after the threads 28 and 29 are cut.

This preferred manufacturing procedure insures that the threads 28 on the body 16 and 29 on the sleeve 18 will be properly aligned when the shoulders 38 on the body and 40 on the sleeve 18 are engaged, as they would be in response to frictional forces as the locking sub is threadedly engaged with the pipe 12. Then, as left-hand torque is applied to the pipe sub, tending to rotate it in a left-hand direction with respect to the pipe 12 and sleeve 18, the shoulders 38 and 40 will separate, the opposed cam surfaces 34 and 36 will tend to axially displace the first and second threaded portions on the body and sleeve relative to each other, and the eccentric centerline of the shaft 30 will tend to radially displace the first and second threaded portions on the body and sleeve portions relative to each other, resulting in a double bind between the fixed spacing of the threads on the pipe 14 and the threads 28 and 29 on the pipe sub 10. The effect is to rapidly and positively lock the sub against further rotation in a direction to disengage the threads on the locking sub and pipe 14. In practice, the body 16 can be expected to rotate only about 180° or less in a counterclockwise direction relative to the pipe 14 before the locking forces prevent further rotation.

When it is desired to release the locking sub 10 from its coupling with the pipe 14, as for example, when the pipe 14 has been brought to the surface of the well, right-hand torque is again applied bringing the shoulders 38 and 40 back into engagement, and realigning the threads 28 and 29 both axially and radially. The holes 50 on the sleeve and 52 on the shaft will again be aligned and a releasing tool 54 may be inserted through the bore of the locking sub 10 and into the aligned holes 50 and 52 as shown in FIG. 5. The releasing tool 54, once in place, prevents relative rotation between the sleeve 18 and body 16 of the sub 10 while transmitting left-hand torque between the body 16 and sleeve 18. The sub 10 and pipe 12 may then be disengaged by counterclockwise rotation of the sub in the usual manner.

The foregoing disclosure and description of the invention is illustrative and explanatory thereof, and various changes may be made in the size, shape and materials of construction, within the scope of the appended claims, without departing from the spirit of the invention.

What is claimed is:

1. An apparatus for making a locked threaded connection between said apparatus and a threaded object, said apparatus comprising:
    a body;
    a first threaded portion on said body;
    a second threaded portion adjacent to said first threaded portion and mounted on said body for axial movement relative to said first threaded portion;
    said first and second threaded portions adapted to form a continuous threaded surface and to rotate together to threadedly engage said first and second threaded portions with said object when said body is rotated in a first direction relative to said object; and,
    means for axially displacing said first and second threaded portions relative to each other when said body is rotated in a direction opposite to said first direction, whereby said first and second threaded portions may not be removed from threaded engagement with said object by rotation of said body in a direction opposite to said first direction.

2. The apparatus according to claim 1 wherein said means for axially displacing said first and second threaded portions comprise a cam surface between said first and second threaded portions.

3. The apparatus according to claim 1 wherein said cam surface has a pitch greater than the thread pitch on said first and second threaded portions.

4. The apparatus according to claim 1 wherein said second threaded portion is also adapted for radial movement relative to said first threaded portion and comprising additionally means for radially displacing said first and second threaded portions relative to each other when said body is rotated in a direction opposite to said first direction.

5. An apparatus for making a locked threaded connection between said apparatus and a threaded object, said apparatus comprising:
    a body;
    a first threaded portion on said body;
    shaft means on said body adjacent to said first threaded portion,
    the vertical centerline of said shaft means being offset radially with respect to the vertical centerline of said first threaded portion;
    a second threaded portion rotatably mounted on said shaft means;
    cam means intermediate said first and second threaded portions; and,
    means for transmitting torque between said body and said second threaded portion when said body is rotated in a first direction;
    said first and second threaded portions adapted upon rotation of said body in said first direction to form a continuous threaded surface and to rotate together, whereby said first and second threaded portions may be threadedly engaged with said object,
    said cam means adapted upon rotation of said body in a direction opposite to said first direction to axially displace said first and second threaded portions relative to each other,
    said shaft means and said second threaded portion adapted upon rotatin of said body in a direction opposite to said first direction to radially displace said first and second threaded portions relative to each other,
    whereby said first and second threaded portions may not be removed from threaded engagement with said object by rotation of said body in a direction opposite to said first direction.

6. The apparatus according to claim 5, comprising additionally,
    means for selectively restraining said second threaded portion against rotation relative to said first threaded portion, whereby said first and second threaded portions may be removed from threaded engagement with said object by rotation of said body in a direction opposite to said first direction.

7. The apparatus according to claim 6 wherein said restraining means comprise aligned openings in said shaft and said second threaded portion adapted to be simultaneously engaged by a releasing tool inserted through said openings to thereby prevent rotation of said second threaded portion relative to said shaft.

8. A locking pipe sub comprising:
    a tubular body having a central bore therethrough,
    a threaded box at the upper end of said tubular body,
    a threaded pin at the lower end of said tubular body, said threaded pin being divided into first and second threaded portions, said first threaded portion being formed integrally with said body, said second threaded portion being formed externally of a cylindrical sleeve;

said sleeve being rotatably mounted on a vertical shaft means attached to said body, the vertical centerline of said shaft means being offset radially with respect to the vertical centerline of said body, whereby rotation of said shaft means relative to said sleeve will displace said second threaded portion radially with respect to said first threaded portion, cam means intermediate said body and said sleeve, said cam means adapted upon rotatin of said sleeve relative to said body to adjust the position of said second threaded portion axially with respect to said first threaded portion, first shoulder means on said body and second shoulder means on said sleeve, said shoulder means adapted, upon engagement, to prevent rotation of said sleeve with respect to said body in one direction, while permitting rotation of said sleeve with respect to said body in the other direction, whereby when said body is rotated in a clockwise direction relative to an external object to engage said pin portion with the threaded box of said object, said first and second shoulder means will engage, and said first and second threaded portions on said pin will be axially and radially aligned to permit threaded engagement of said pin with said box portion of said object, but upon counterclockwise rotation of said body relative to said object, said first and second shoulder means will separate, said cam means will axially displace said first and second threaded portions relative to each other and rotation of said shaft relative to said sleeve will radially displace said first and second threaded portions relative to each other, whereby the threads of said first and second threaded portions will become bound axially and radially in said threaded box of said object and further counterclockwise rotation of said body relative to said object will be prevented.

9. The apparatus according to claim 8 comprising additionally means for selectively preventing rotation of said sleeve relative to said shaft in either direction, whereby said pin may be selectively disengaged from said threaded box of said external object.

* * * * *